US012794529B2

(12) United States Patent
(10) Patent No.: US 12,794,529 B2
(45) Date of Patent: Nov. 10, 2026

Hindy et al.

(54) DETERMINING CHANNEL STATE INFORMATION REFERENCE SIGNALS

(71) Applicant: Lenovo (Singapore) Pte. Ltd., New Tech Park (SG)

(72) Inventors: Ahmed Hindy, Forest Park, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 684 days.

(21) Appl. No.: 18/013,128

(22) PCT Filed: Jun. 24, 2021

(86) PCT No.: PCT/IB2021/055579

§ 371 (c)(1),
(2) Date: Dec. 27, 2022

(87) PCT Pub. No.: WO2021/260603

PCT Pub. Date: Dec. 30, 2021

(65) Prior Publication Data

US 2023/0361831 A1 Nov. 9, 2023

Related U.S. Application Data

(60) Provisional application No. 63/044,912, filed on Jun. 26, 2020.

(51) Int. Cl.

*H04B 7/06* (2006.01)
*H04L 5/00* (2006.01)
*H04W 16/28* (2009.01)

(52) U.S. Cl.

CPC ......... *H04B 7/0626* (2013.01); *H04L 5/0051* (2013.01); *H04W 16/28* (2013.01)

(58) Field of Classification Search

CPC ................ H04B 7/0626; H04B 7/0632; H04L 5/0051; H04W 16/28

See application file for complete search history.

(56) References Cited

U.S. PATENT DOCUMENTS

2017/0311296 A1* 10/2017 Onggosanusi ....... H04B 7/0456
2018/0091207 A1* 3/2018 Kakishima ........ H04L 25/03343

(Continued)

OTHER PUBLICATIONS

PCT/IB2021/055579, "Notification of Transmittal of the International Search Report and the Written Opinion of the International Searching Authority, or the Declaration", International Searching Authority, Sep. 16, 2021, pp. 1-13.

(Continued)

*Primary Examiner* — Liem H. Nguyen
(74) *Attorney, Agent, or Firm* — Kunzler Needham Hilton

(57) ABSTRACT

Apparatuses, methods, and systems are disclosed for determining channel state information reference signals. One method includes transmitting a set of sounding reference signals. The method includes receiving a set of channel state information reference signals. The set of channel state information reference signals are determined based on the set of sounding reference signals received by a network. The method includes identifying a set of ports based on the set of channel state information reference signals. The method includes transmitting channel state information feedback comprising a rank indicator indicating a number of layers.

20 Claims, 6 Drawing Sheets

(56) References Cited

U.S. PATENT DOCUMENTS

| | | | | |
|---|---|---|---|---|
| 2018/0241454 | A1* | 8/2018 | Lee | H04L 5/0048 |
| 2018/0278316 | A1* | 9/2018 | Yang | H04B 7/0617 |
| 2020/0044803 | A1 | 2/2020 | Li et al. | |
| 2021/0136566 | A1* | 5/2021 | Manolakos | H04W 8/24 |
| 2021/0297134 | A1* | 9/2021 | Rahman | H04B 7/0639 |
| 2021/0314931 | A1* | 10/2021 | Farag | H04B 7/0617 |
| 2022/0116965 | A1* | 4/2022 | Park | H04L 5/0048 |
| 2022/0224391 | A1* | 7/2022 | Ramireddy | H04B 7/0417 |
| 2022/0224479 | A1* | 7/2022 | He | H04L 5/0023 |
| 2022/0311492 | A1* | 9/2022 | Wu | H04B 7/0626 |
| 2022/0345195 | A1* | 10/2022 | Jang | H04B 7/0404 |
| 2023/0013510 | A1* | 1/2023 | Ge | H04L 5/0094 |
| 2023/0098329 | A1* | 3/2023 | Yuan | H04B 7/0628 370/329 |
| 2023/0147146 | A1* | 5/2023 | Ren | H04W 56/0035 370/329 |
| 2023/0299914 | A1* | 9/2023 | Lim | H04L 5/0051 370/329 |
| 2023/0361842 | A1* | 11/2023 | Hajri | H04B 7/0617 |

OTHER PUBLICATIONS

3GPP, "3rd Generation Partnership Project; Technical Specification Group Radio Access Network; NR; User Equipment (UE) feature list (Release 15)", 3GPP TR 38.822 V15.0.1, Jul. 2019, pp. 1-64.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

* cited by examiner

DETERMINING CHANNEL STATE INFORMATION REFERENCE SIGNALS

CROSS-REFERENCE TO RELATED APPLICATIONS

This application claims priority to U.S. Patent Application Ser. No. 63/044,912 entitled "APPARATUSES, METHODS, AND SYSTEMS FOR FURTHER-ENHANCED TYPE-II CODEBOOK UNDER FDD RECIPROCITY AND SRS PORT SWITCHING" and filed on Jun. 26, 2020 for Ahmed Hindy, which is incorporated herein by reference in its entirety.

FIELD

The subject matter disclosed herein relates generally to wireless communications and more particularly relates to determining channel state information reference signals.

BACKGROUND

In certain wireless communications networks, a codebook may be used for port selection. However, the port selected may be inefficient.

BRIEF SUMMARY

Methods for determining channel state information reference signals are disclosed. Apparatuses and systems also perform the functions of the methods. One embodiment of a method includes transmitting a set of sounding reference signals. In some embodiments, the method includes receiving a set of channel state information reference signals. The set of channel state information reference signals are determined based on the set of sounding reference signals received by a network. In certain embodiments, the method includes identifying a set of ports based on the set of channel state information reference signals. In various embodiments, the method includes transmitting channel state information feedback comprising a rank indicator indicating a number of layers.

One apparatus for determining channel state information reference signals includes a transmitter that transmits a set of sounding reference signals. In some embodiments, the apparatus includes a receiver that receives a set of channel state information reference signals. The set of channel state information reference signals are determined based on the set of sounding reference signals received by a network. In various embodiments, the apparatus includes a processor that identifies a set of ports based on the set of channel state information reference signals; wherein the transmitter transmits channel state information feedback comprising a rank indicator indicating a number of layers.

Another embodiment of a method for determining channel state information reference signals includes receiving a set of sounding reference signals. In some embodiments, the method includes transmitting a set of channel state information reference signals, wherein the set of channel state information reference signals are determined based on the set of sounding reference signals received by a network, and a set of ports is identified based on the set of channel state information reference signals. In certain embodiments, the method includes receiving channel state information feedback comprising a rank indicator indicating a number of layers.

Another apparatus for determining channel state information reference signals includes a receiver that receives a set of sounding reference signals. In some embodiments, the apparatus includes a transmitter that transmits a set of channel state information reference signals, wherein the set of channel state information reference signals are determined based on the set of sounding reference signals received by a network, and a set of ports is identified based on the set of channel state information reference signals; wherein the receiver receives channel state information feedback comprising a rank indicator indicating a number of layers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
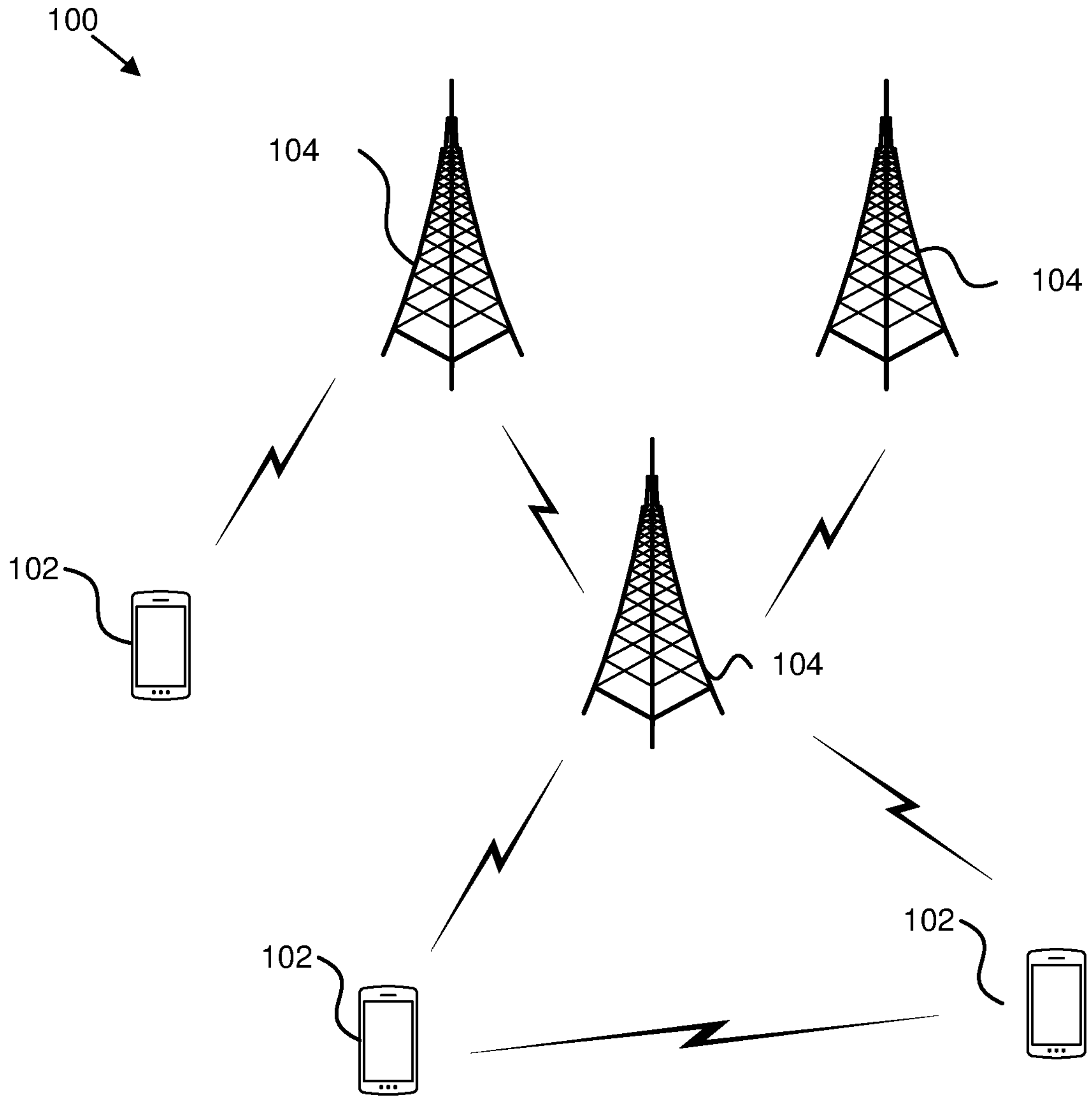
FIG. 1 is a schematic block diagram illustrating one embodiment of a wireless communication system for determining channel state information reference signals.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining channel state information reference signals. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may transmit a set of sounding reference signals. In some embodiments, the remote unit 102 may receive a set of channel state information reference signals, wherein the set of channel state information reference signals are determined based on the set of sounding reference signals received by a network. In certain embodiments, the remote unit 102 may identify a set of ports based on the set of channel state information reference signals. In various embodiments, the remote unit 102 may transmit channel state information feedback comprising a rank indicator indicating a number of layers. Accordingly, the remote unit 102 may be used for determining channel state information reference signals.

In certain embodiments, a network unit 104 may receive a set of sounding reference signals. In some embodiments, the network unit 104 may transmit a set of channel state information reference signals, wherein the set of channel state information reference signals are determined based on the set of sounding reference signals received by a network, and a set of ports is identified based on the set of channel state information reference signals. In various embodiments, the network unit 104 may receive channel state information feedback comprising a rank indicator indicating a number of layers. Accordingly, the network unit 104 may be used for determining channel state information reference signals.

Figure 2:
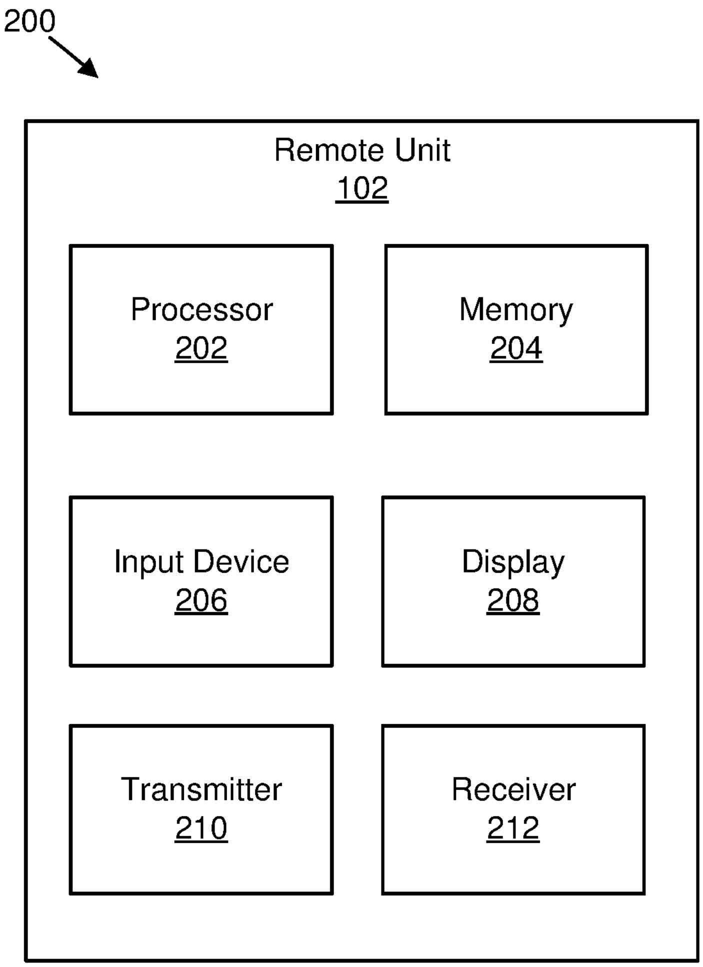
FIG. 2 is a schematic block diagram illustrating one embodiment of an apparatus that may be used for determining channel state information reference signals.

FIG. 2 depicts one embodiment of an apparatus 200 that may be used for determining channel state information reference signals. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 may transmit a set of sounding reference signals. In various embodiments, the receiver 212 may receive a set of channel state information reference signals, wherein the set of channel state information reference signals are determined based on the set of sounding reference signals received by a network. In certain embodiments, the processor 202 may identify a set of ports based on the set of channel state information reference signals; wherein the transmitter 210 transmits channel state information feedback comprising a rank indicator indicating a number of layers.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
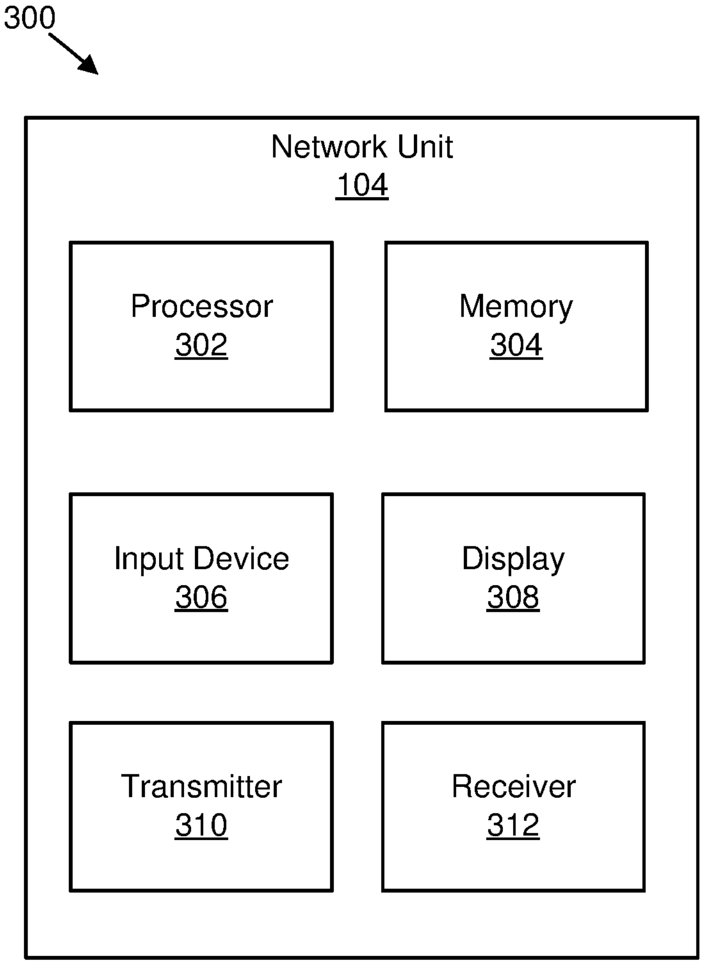
FIG. 3 is a schematic block diagram illustrating one embodiment of an apparatus that may be used for determining channel state information reference signals.

FIG. 3 depicts one embodiment of an apparatus 300 that may be used for determining channel state information reference signals. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may receive a set of sounding reference signals. In various embodiments, the transmitter 310 may transmit a set of channel state information reference signals, wherein the set of channel state information reference signals are determined based on the set of sounding reference signals received by a network, and a set of ports is identified based on the set of channel state information reference signals; wherein the receiver 312 receives channel state information feedback comprising a rank indicator indicating a number of layers.

In various embodiments, such as for a new radio ("NR") Type-II codebook, a number of pre-coding matrix indicator ("PMI") bits fed back from a user equipment ("UE") in a gNB via uplink control information ("UCI") may be large (e.g., >1000 bits at a large bandwidth). In certain embodiments, a number of channel state information ("CSI") reference signal ("RS") ("CSI-RS") ports sent in a downlink channel to enable channel estimation at a user equipment may be large, leading to higher system complexity and loss of resources over reference signaling. In some embodiments, reduction of a number of PMI feedback bits and/or a reduction in a number of CSI-RS ports used may improve efficiency. In various embodiments, a number of CSI-RS ports is reduced by applying a spatial beamforming process. In certain embodiments, a channel correlation between uplink and downlink channels may be used to reduce CSI feedback overhead, even in a frequency division duplexing ("FDD") mode in which an uplink ("UL") to downlink ("DL") carrier frequency spacing is not too large.

In some embodiments, techniques may be used for CSI-RS beamforming and uplink CSI feedback reporting that improve the efficiency of Type-II port-selection codebook. In various embodiments, sounding reference signal ("SRS") port switching in a UE sounding procedure may impact CSI feedback reporting from the UE.

In certain embodiments, spatial relation information may be redefined. In some embodiments, if a UE is configured with a higher layer parameter (e.g., spatialRelationInfo) containing an identifier ("ID") of a reference (e.g., csi-RS-Index), the UE may transmit a target SRS resource with the same spatial domain transmission filter used for the reception of a reference periodic CSI-RS, a reference semi-persistent CSI-RS, or a latest reference aperiodic CSI-RS.

In various embodiments, for FDD-reciprocity based CSI feedback, where a port-selection codebook is used, aperiodic SRS may be configured in downlink control information ("DCI") for use in a port-selection codebook.

In certain embodiments, for FDD-reciprocity based CSI feedback, where a port-selection codebook is used, a spatial-domain transmit filter used for transmission of an SRS may be similar to the spatial-domain filter used for the reception of a subsequent CSI-RS if a UE is configured with a higher layer parameter (e.g., a parameter in SRS-ResourceSet set to 'antennaSwitching').

In some embodiments, an equation may be used to indicate a validity of a spatial relation (e.g., if a UE receives a DCI triggering an SRS in slot n). In such embodiments, a spatial-domain filter used for transmitting a target SRS at slot n+k0 may be the same as a receive spatial filter used for CSI-RS that is received in a time window from slot n+k1 up to slot n+k2, where k0, k1, and k2 are arbitrary positive integer values that are set by a rule or configured by higher-layer signaling, and satisfy $k0<k1\leq k2$.

In various embodiments, an equation may be used to indicate a validity of a spatial relation (e.g., if a UE transmits an SRS in slot n). In such embodiments, a spatial-domain filter used for receiving an aperiodic CSI-RS for up to slot n+k3 is the same as a spatial-domain filter used for transmitting a target SRS.

In certain embodiments, no equation may be used. In such embodiments, a spatial-domain filter for CSI-RS reception is the same as a spatial-domain filter of a prior SRS transmission if a UE is configured with a configuration (e.g., CSI-ReportConfig) with a higher layer parameter (e.g., reportQuantity) set to a certain value (e.g., cri-RI-PMI-CQI, or cri-RI-LI-PMI-CQI), whenever the UE is configured with a (e.g., CSI-ReportConfig) with the higher layer parameter (e.g., codebookType) set to a certain value (e.g., typeII-PortSelection, typeII-PortSelection-r16, or typeII-PortSelection-r17), and/or whenever the higher-layer parameter usage for the SRS resource set is set to a certain value (e.g., antenna switching).

In some embodiments, quasi-co-location ("QCL") relationships may be used to imply a spatial relationship between a target SRS and a CSI-RS (e.g., aperiodic), which are used for uplink and downlink channel estimation, respectively. In one example, the target SRS and the CSI-RS may be directly QCLed, or two CSI-RSs can be QCLed (e.g., CSI-RSs with IDs 1 and 2 are QCLed) to indicate that CSI-RS 2 (e.g., received after transmitting the target SRS) should use the same spatial filter as CSI-RS 1 (e.g., received before transmitting the target SRS and also indicated in spatial relationship information corresponding to the target SRS resource set), and the target SRS and CSI-RS 2 should be respectively transmitted and received with the same spatial filter.

In various embodiments, a QCL source RS of QCL type 'QCL-TypeD' (e.g., in a transmission configuration indicator ("TCI") state associated with a CSI-RS) for a CSI-RS (e.g., subsequent CSI-RS-CSI-RS 2 which may be aperiodic CSI-RS) is the same as (or assumed to be the same as) a reference RS configured in SRS spatial relationship information of a target SRS (e.g., sent prior to the CSI-RS, most recent SRS transmission, transmitted x symbols prior to the reception of the CSI-RS or reception of the DCI triggering the aperiodic CSI-RS). In such embodiments, the UE receives the CSI-RS with the same spatial domain filter as the spatial domain transmission filter used for transmission of the target SRS. The UE transmits the target SRS with the same spatial domain transmission filter used for reception of the reference RS configured in the SRS spatial relationship information associated with the target SRS resource.

It should be noted that that the same spatial relationship information applies to all SRS resources in the same SRS resource set. Moreover, where a higher-layer parameter usage is set to a certain value (e.g., antenna switching), a case that supports different ports having different spatial relationships is a 1T4R case. This may be the only case allowing two different SRS resource sets without the time domain behavior being the same. In certain embodiments for 1T4R, zero or one SRS resource set configured with higher layer parameter resourceType in SRS-ResourceSet set to 'periodic' or 'semi-persistent' with four SRS resources transmitted in different symbols, each SRS resource in a given set consisting of a single SRS port, and the SRS port of each resource is associated with a different UE antenna port. In some embodiments for 1T4R, zero or two SRS resource sets each configured with higher layer parameter resourceType in SRS-ResourceSet set to 'aperiodic' and with a total of four SRS resources transmitted in different symbols of two different slots, and where the SRS port of each SRS resource in the given two sets is associated with a different UE antenna port. The two sets are each configured with two SRS resources, or one set is configured with one SRS resource and the other set is configured with three SRS resources.

In various embodiments for 2T4R, up to two SRS resource sets configured with a different value for the higher layer parameter resourceType in SRS-ResourceSet set, where each SRS resource set has two SRS resources transmitted in different symbols, each SRS resource in a given set consisting of two SRS ports, and the SRS port pair of the second resource is associated with a different UE antenna port pair than the SRS port pair of the first resource. Two SRS resource sets can be configured both with the higher layer parameter resourceType set to 'aperiodic' in SRS-ResourceSet set, where each SRS resource set has two SRS resources transmitted in different symbols, each SRS resource in a given set consisting of a single SRS port, and the SRS port of the second resource is associated with a different UE antenna port pair than the SRS port of the first resource.

In certain embodiments, 2T4R may be used to support UE with back-to-back panels, where only one panel (e.g., represented by two ports) may be activated at a given time for transmission and/or reception from a desired gNB, and the other panel may be switched off or communicate with another node. If so, only two SRS ports may be activated.

In some embodiments, there may be a rank indicator ("RI") of a codebook. In various embodiments, due to the exploitation of FDD reciprocity of a channel, a RI of a codebook may not exceed a number of SRS ports at an uplink phase. In such embodiments, a UE may report a RI value ν according to a configured higher layer parameter (e.g., typeII-PortSelectionRI-Restriction, typeII-PortSelectionRI-Restriction-r16, or typeII-PortSelectionRI-Restriction-r17). Moreover, in such embodiments: 1) the UE shall not report ν>4; 2) the UE shall not report ν>s, where s represents the higher-layer parameter nrofSRS-Ports representing a number of SRS ports within a higher-layer parameter SRS-Resource configuring a given UE; 3) the UE shall not report ν>min {s, 4}, where s is defined as set forth herein; and 4) the UE shall not report ν>x, where x=max {x1, . . . , xm} represents the allowed configurations on the indicated UE capability supportedSRS-TxPortSwitch, such as 'tx1ry1- . . . -txmrym'. In various embodiments, x=f(x1, . . . , xm) for an arbitrary function f(x1, . . . , xm), where min{x1, . . . , xm}≤x≤max{x1, . . . , xm}.

In certain embodiments, NR Type-II port selection codebooks may be used.

In some embodiments, spatial correlation may be exploited in a CSI-RS beamforming process under codebook type 'typeII-PortSelection', and both spatial and frequency correlation may be exploited in the CSI-RS beamforming process under codebook type 'typeII-PortSelection-r16', if a higher layer parameter usage in SRS-ResourceSet is set as 'antennaSwitching', and a higher layer parameter spatialRelationInfo contains an ID of a reference 'csi-RS-Index' that is aperiodic.

In various embodiments, there may be a higher layer parameter in a DCI-triggering field (e.g., ReciprocityFlag) that indicates that a CSI feedback is based on FDD channel reciprocity. In such embodiments, the higher layer parameter may be semi-statically configured. Moreover, in such embodiments, if the higher-layer parameter (e.g., ReciprocityFlag) is set to true and the parameter codebooktype is set to 'typeII-PortSelection-r16', a UE sets Mv as one of the following configurations in the corresponding PMI: 1) Mv=1 for layer l=1, . . . v; and 2) Mv=1 for layers l=1, . . . q, where q takes on values q=0, . . . v, and $$M_v = \left\lceil p_v \frac{N_3}{R} \right\rceil$$

for layers l=q+1, . . . v. In certain embodiments, q=x, where x which may be defined herein in other embodiments. In some embodiments, q=1.

As may be appreciated, Mv may be determined by a rule, by a higher-layer configuration, or via a feedback parameter signaled in part 1 of a CSI report (e.g., a parameter with bitwidth of $\lceil \log_2(RI_{max}) \rceil$, where RImax is the maximum rank indicator possible for the codebook).

In various embodiments, hybrid PMI feedback may be based on SRS switching.

In some embodiments, SRS switching may not be supported (e.g., a UE capability supportedSRS-TxPortSwitch is set to "Not supported", which indicates that the UE would not be able to send SRSs from multiple antenna ports within the same slot). In such embodiments, FDD channel reciprocity may only hold for one port from which SRS was transmitted, but not for the remainder of the ports. Moreover, in such embodiments, the UE may report less information or information in a distinct format for the port from which SRS was transmitted, or a layer corresponding to this port. This may trigger a hybrid PMI, wherein the layer information corresponding to a given report may be fed back in a different format compared with other layers that do not map to a port from which SRS was transmitted.

In various embodiments, hybrid channel feedback across different layers may be supported, wherein parameter values and/or a bitwidth to represent these parameters in a PMI feedback report may change from one layer to another based on port switching as indicated by a UE capability parameter (e.g., supportedSRS-TxPortSwitch). For example, layers that do not correspond to an SRS transmission port may reuse 'typeII-r16' or 'typeII-PortSelection-r16', while layers corresponding to the SRS transmission port may use a different codebook type (e.g., 'typeII-PortSelection-r17') as compared with the other layers or ports that would use another codebook type (e.g., 'typeII-PortSelection-r17'). It should be noted that one or more of reference signals, higher-layer parameters, and CSI feedback information of one codebook may depend on those of another codebook. In certain embodiments, the same codebook type (e.g., 'typeII-PortSelection-r16') may be used. In such embodiments, parameters, parameter values, a PMI feedback format, and/or a PMI feedback size per layer may be different. For example, Mv=1 for layers l=1, . . . q, where q∈{0, . . . v} represents the number of SRS ports transmitted, whereas $$M_v = \left\lceil p_v \frac{N_3}{R} \right\rceil$$

for layers l=q+1, . . . v, correspond to layers for which no SRS was transmitted.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")0, or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In various embodiments, a transmission configuration indicator ("TCI") state associated with a target transmission may indicate a quasi-collocation relationship between a target transmission (e.g., target RS of demodulation reference signal ("DM-RS") ports of the target transmission during a transmission occasion) and source reference signals (e.g., synchronization signal block ("SSB"), channel state information reference signal ("CSI-RS"), and/or sounding reference signal ("SRS")) with respect to quasi co-location type parameters indicated in a corresponding TCI state. A device may receive a configuration of multiple transmission configuration indicator states for a serving cell for transmissions on the serving cell.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 4:
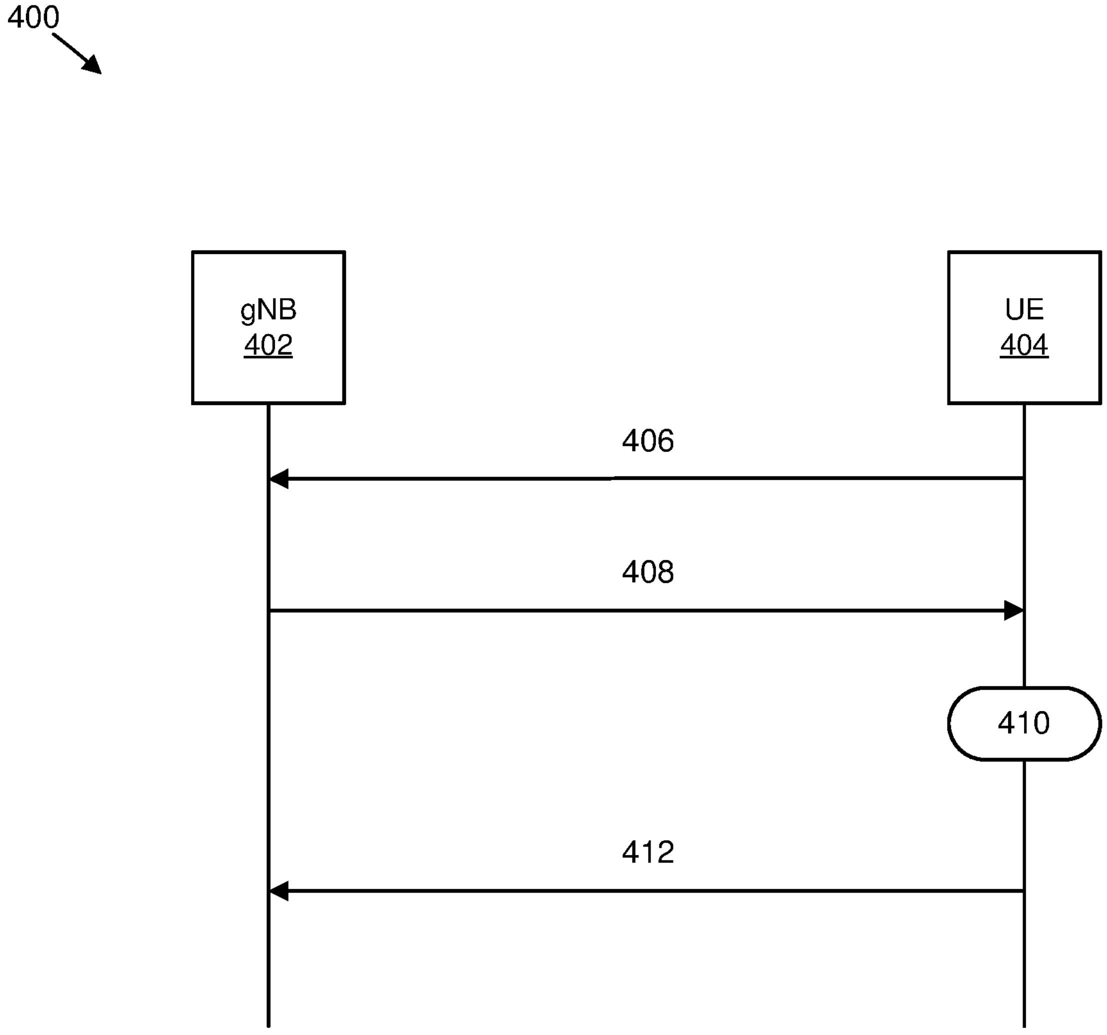
FIG. 4 is a schematic block diagram illustrating one embodiment of communications for determining channel state information reference signals.

FIG. 4 is a schematic block diagram illustrating one embodiment of communications 400 for determining channel state information reference signals. The communications 400 include messages transmitted between a gNB 402 and a UE 404. As may be appreciated, each of the communications 400 may include one or more messages.

In a first communications 406 transmitted from the UE 404 to the gNB 402, the UE 404 may transmit a set of sounding reference signals to the gNB 402. In a second communication 408 transmitted from the gNB 402 to the UE 404, the gNB 402 may transmit a set of channel state information reference signals to the UE 404. The set of channel state information reference signals are determined based on the set of sounding reference signals received by a network. The UE 404 identifies a set of ports based on the set of channel state information reference signals. In a third communications 412 transmitted from the UE 404 to the gNB 402, the UE 404 may transmit channel state information feedback comprising a rank indicator indicating a number of layers to the gNB 402.

Figure 5:
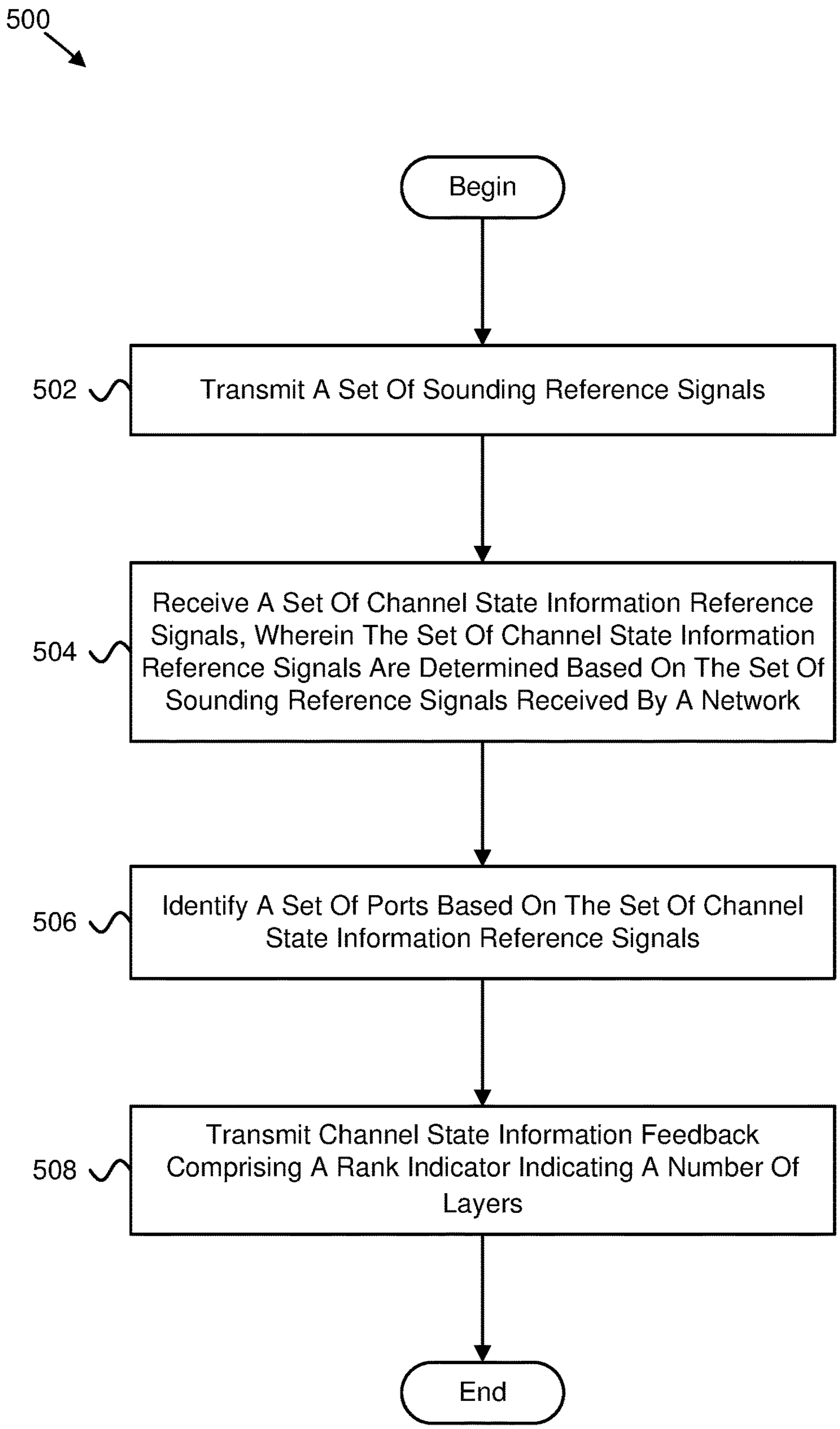
FIG. 5 is a flow chart diagram illustrating one embodiment of a method for determining channel state information reference signals.

FIG. 5 is a flow chart diagram illustrating one embodiment of a method 600 for determining channel state information reference signals. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 500 includes transmitting 502 a set of sounding reference signals. In some embodiments, the method 500 includes receiving 504 a set of channel state information reference signals. The set of channel state information reference signals are determined based on the set of sounding reference signals received by a network. In certain embodiments, the method 500 includes identifying 506 a set of ports based on the set of channel state information reference signals. In various embodiments, the method 500 includes transmitting 508 channel state information feedback comprising a rank indicator indicating a number of layers.

In certain embodiments, the set of sounding reference signals and the set of channel state information reference signals are configured with downlink control information. In some embodiments, the set of sounding reference signals are configured with aperiodic transmission. In various embodiments, the set of channel state information reference signals are configured with aperiodic reception.

In one embodiment, a transmit spatial filter used to transmit the set of sounding reference signals is the same as a receive spatial filter used to receive the set of channel state information reference signals. In certain embodiments, the transmit spatial filter and the receive spatial filter are used within a given number of slots after receiving downlink control information that triggers the set of sounding reference signals, the set of channel state information reference signals, or a combination thereof. In some embodiments, the receive spatial filter and the transmit spatial filter are used within a given number of slots after transmitting the set of sounding reference signals.

In various embodiments, the transmit spatial filter for the set of sounding reference signals is the same as the receive spatial filter for a subsequent set of channel state information reference signals in response to at least one of the following: a higher-layer parameter related to a codebook type is set to a class of type-II port selection codebooks, a higher-layer parameter related to a report quantity includes precoding matrix information, and a higher-layer parameter related to usage of the set of sounding reference signals is set to antenna switching. In one embodiment, the transmit spatial filter for the set of sounding reference signals is the same as the receive spatial filter for a subsequent set of channel state information reference signals in response to a quasi-co-location relationship of at least Type D between the set of channel state information reference signals and other reference signals including the set of sounding reference signals. In certain embodiments, the transmit spatial filter for the set of sounding reference signals is the same as the receive spatial filter for a subsequent set of channel state information reference signals in response to a quasi-co-location relationship of at least Type D between the set of channel state information reference signals and other reference signals including a set of channel state information reference signals that are received prior to the transmission of the set of sounding reference signals.

In some embodiments, a corresponding value of the rank indicator in a channel state information feedback report corresponding to a Type-II port selection codebook family is limited to a constrained rank indicator value that is less than or equal to: a value 4; a corresponding value of a number of configured sounding reference signal ports; a function of a number of supported sounding reference signal port transmissions indicated by a user equipment capability parameter corresponding to transmit antenna port switching for the set of sounding reference signals; or some combination thereof. In various embodiments, a number of bits allocated for reporting the rank indicator in a first part of the channel state information feedback report is based on a base-two logarithmic function of the constrained rank indicator value. In one embodiment, a higher layer parameter in downlink control information indicates that channel state information feedback is based on frequency division duplexing channel reciprocity.

In certain embodiments, a channel state information feedback parameter My is set to one for a subset of a set of layers. In some embodiments, the set of ports are partitioned into two sets of ports comprising a first set of ports and a second set of ports, and each port of the set of ports maps to a corresponding layer. In various embodiments, a channel state information feedback report size, a channel state information feedback report format, channel state information feedback report parameter values, or some combination thereof vary across layers corresponding to the first set of ports, and layers corresponding to the second set of ports.

Figure 6:
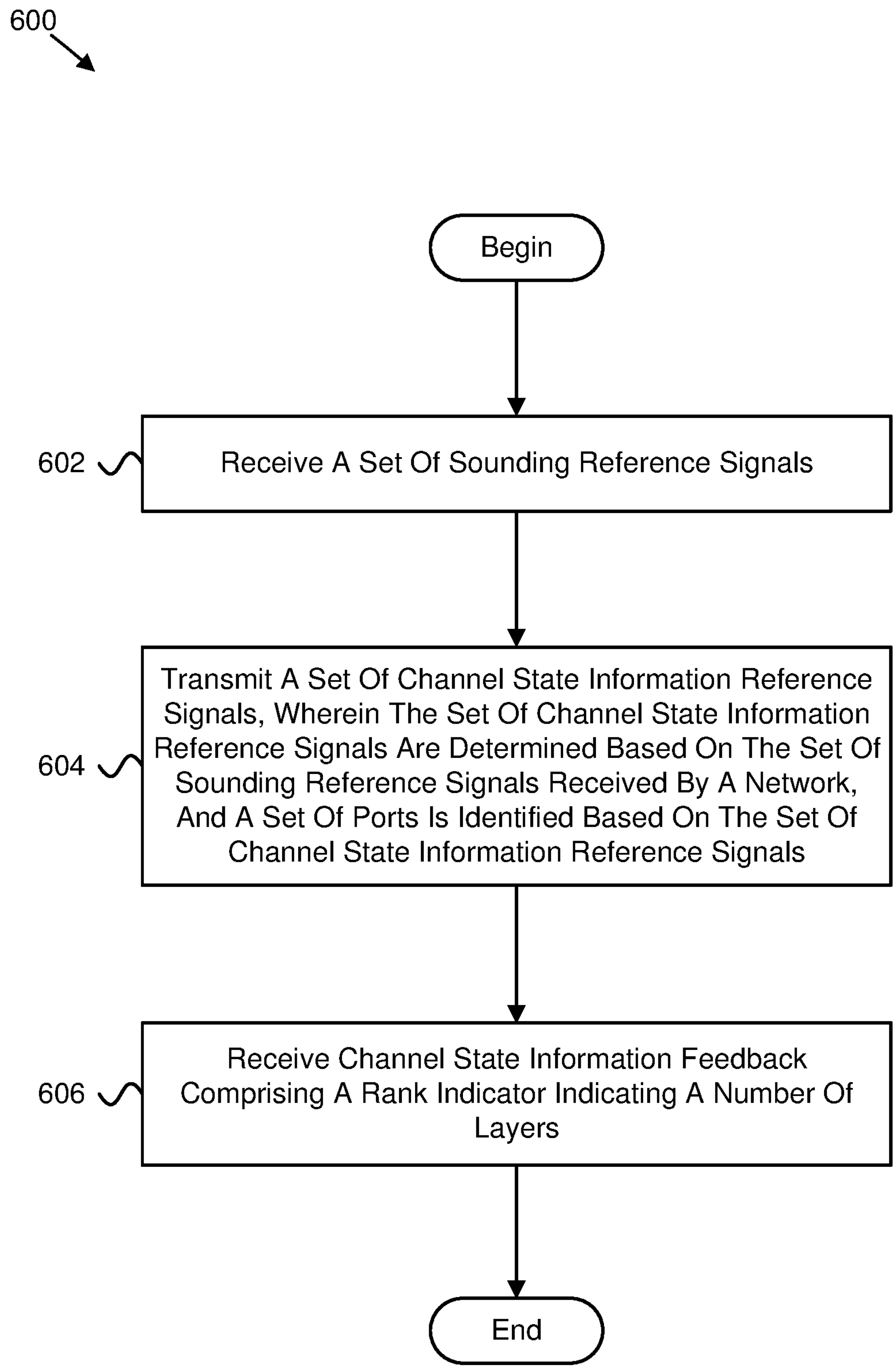
FIG. 6 is a flow chart diagram illustrating another embodiment of a method for determining channel state information reference signals.

FIG. 6 is a flow chart diagram illustrating one embodiment of a method 600 for determining channel state information reference signals. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602 a set of sounding reference signals. In some embodiments, the method 600 includes transmitting 604 a set of channel state information reference signals, wherein the set of channel state information reference signals are determined based on the set of sounding reference signals received by a network, and a set of ports is identified based on the set of channel state information reference signals. In certain embodiments, the method 600 includes receiving 606 channel state information feedback comprising a rank indicator indicating a number of layers.

In certain embodiments, the set of sounding reference signals and the set of channel state information reference signals are configured with downlink control information. In some embodiments, the set of sounding reference signals are configured with aperiodic transmission. In various embodiments, the set of channel state information reference signals are configured with aperiodic reception.

In one embodiment, a transmit spatial filter used to transmit the set of sounding reference signals is the same as a receive spatial filter used to receive the set of channel state information reference signals. In certain embodiments, the transmit spatial filter and the receive spatial filter are used within a given number of slots after receiving downlink control information that triggers the set of sounding reference signals, the set of channel state information reference signals, or a combination thereof. In some embodiments, the receive spatial filter and the transmit spatial filter are used within a given number of slots after transmitting the set of sounding reference signals.

In various embodiments, the transmit spatial filter for the set of sounding reference signals is the same as the receive spatial filter for a subsequent set of channel state information reference signals in response to at least one of the following: a higher-layer parameter related to a codebook type is set to a class of type-II port selection codebooks, a higher-layer parameter related to a report quantity includes precoding matrix information, and a higher-layer parameter related to usage of the set of sounding reference signals is set to antenna switching. In one embodiment, the transmit spatial filter for the set of sounding reference signals is the same as the receive spatial filter for a subsequent set of channel state information reference signals in response to a quasi-co-location relationship of at least Type D between the set of channel state information reference to signals and other reference signals including the set of sounding reference signals. In certain embodiments, the transmit spatial filter for the set of sounding reference signals is the same as the receive spatial filter for a subsequent set of channel state information reference signals in response to a quasi-co-location relationship of at least Type D between the set of channel state information reference signals and other reference signals including a set of channel state information reference signals that are received prior to the transmission of the set of sounding reference signals.

In some embodiments, a corresponding value of the rank indicator in a channel state information feedback report corresponding to a Type-II port selection codebook family is limited to a constrained rank indicator value that is less than or equal to: a value 4; a corresponding value of a number of configured sounding reference signal ports; a function of a number of supported sounding reference signal port transmissions indicated by a user equipment capability parameter corresponding to transmit antenna port switching for the set of sounding reference signals; or some combination thereof. In various embodiments, a number of bits allocated for reporting the rank indicator in a first part of the channel state information feedback report is based on a base-two logarithmic function of the constrained rank indicator value. In one embodiment, a higher layer parameter in downlink control information indicates that channel state information feedback is based on frequency division duplexing channel reciprocity.

In certain embodiments, a channel state information feedback parameter My is set to one for a subset of a set of layers. In some embodiments, the set of ports are partitioned into two sets of ports comprising a first set of ports and a second set of ports, and each port of the set of ports maps to a corresponding layer. In various embodiments, a channel state information feedback report size, a channel state information feedback report format, channel state information feedback report parameter values, or some combination thereof vary across layers corresponding to the first set of ports, and layers corresponding to the second set of ports.

In one embodiment, a method comprises: transmitting a set of sounding reference signals; receiving a set of channel state information reference signals, wherein the set of channel state information reference signals are determined based on the set of sounding reference signals received by a network; identifying a set of ports based on the set of channel state information reference signals; and transmitting channel state information feedback comprising a rank indicator indicating a number of layers.

In certain embodiments, the set of sounding reference signals and the set of channel state information reference signals are configured with downlink control information.

In some embodiments, the set of sounding reference signals are configured with aperiodic transmission.

In various embodiments, the set of channel state information reference signals are configured with aperiodic reception.

In one embodiment, a transmit spatial filter used to transmit the set of sounding reference signals is the same as a receive spatial filter used to receive the set of channel state information reference signals.

In certain embodiments, the transmit spatial filter and the receive spatial filter are used within a given number of slots after receiving downlink control information that triggers the set of sounding reference signals, the set of channel state information reference signals, or a combination thereof.

In some embodiments, the receive spatial filter and the transmit spatial filter are used within a given number of slots after transmitting the set of sounding reference signals.

In various embodiments, the transmit spatial filter for the set of sounding reference signals is the same as the receive spatial filter for a subsequent set of channel state information reference signals in response to at least one of the following: a higher-layer parameter related to a codebook type is set to a class of type-II port selection codebooks, a higher-layer parameter related to a report quantity includes precoding matrix information, and a higher-layer parameter related to usage of the set of sounding reference signals is set to antenna switching.

In one embodiment, the transmit spatial filter for the set of sounding reference signals is the same as the receive spatial filter for a subsequent set of channel state information reference signals in response to a quasi-co-location relationship of at least Type D between the set of channel state information reference signals and other reference signals including the set of sounding reference signals.

In certain embodiments, the transmit spatial filter for the set of sounding reference signals is the same as the receive spatial filter for a subsequent set of channel state information reference signals in response to a quasi-co-location relationship of at least Type D between the set of channel state information reference signals and other reference signals including a set of channel state information reference signals that are received prior to the transmission of the set of sounding reference signals.

In some embodiments, a corresponding value of the rank indicator in a channel state information feedback report corresponding to a Type-II port selection codebook family is limited to a constrained rank indicator value that is less than or equal to: a value 4; a corresponding value of a number of configured sounding reference signal ports; a function of a number of supported sounding reference signal port transmissions indicated by a user equipment capability parameter corresponding to transmit antenna port switching for the set of sounding reference signals; or some combination thereof.

In various embodiments, a number of bits allocated for reporting the rank indicator in a first part of the channel state information feedback report is based on a base-two logarithmic function of the constrained rank indicator value.

In one embodiment, a higher layer parameter in downlink control information indicates that channel state information feedback is based on frequency division duplexing channel reciprocity.

In certain embodiments, a channel state information feedback parameter My is set to one for a subset of a set of layers.

In some embodiments, the set of ports are partitioned into two sets of ports comprising a first set of ports and a second set of ports, and each port of the set of ports maps to a corresponding layer.

In various embodiments, a channel state information feedback report size, a channel state information feedback report format, channel state information feedback report parameter values, or some combination thereof vary across layers corresponding to the first set of ports, and layers corresponding to the second set of ports.

In one embodiment, an apparatus comprises: a transmitter that transmits a set of sounding reference signals; a receiver that receives a set of channel state information reference signals, wherein the set of channel state information reference signals are determined based on the set of sounding reference signals received by a network; and a processor that identifies a set of ports based on the set of channel state information reference signals; wherein the transmitter transmits channel state information feedback comprising a rank indicator indicating a number of layers.

In certain embodiments, the set of sounding reference signals and the set of channel state information reference signals are configured with downlink control information.

In some embodiments, the set of sounding reference signals are configured with aperiodic transmission.

In various embodiments, the set of channel state information reference signals are configured with aperiodic reception.

In one embodiment, a transmit spatial filter used to transmit the set of sounding reference signals is the same as a receive spatial filter used to receive the set of channel state information reference signals.

In certain embodiments, the transmit spatial filter and the receive spatial filter are used within a given number of slots after receiving downlink control information that triggers the set of sounding reference signals, the set of channel state information reference signals, or a combination thereof.

In some embodiments, the receive spatial filter and the transmit spatial filter are used within a given number of slots after transmitting the set of sounding reference signals.

In various embodiments, the transmit spatial filter for the set of sounding reference signals is the same as the receive spatial filter for a subsequent set of channel state information reference signals in response to at least one of the following: a higher-layer parameter related to a codebook type is set to a class of type-II port selection codebooks, a higher-layer parameter related to a report quantity includes precoding matrix information, and a higher-layer parameter related to usage of the set of sounding reference signals is set to antenna switching.

In one embodiment, the transmit spatial filter for the set of sounding reference signals is the same as the receive spatial filter for a subsequent set of channel state information reference signals in response to a quasi-co-location relationship of at least Type D between the set of channel state information reference signals and other reference signals including the set of sounding reference signals.

In certain embodiments, the transmit spatial filter for the set of sounding reference signals is the same as the receive spatial filter for a subsequent set of channel state information reference signals in response to a quasi-co-location relationship of at least Type D between the set of channel state information reference signals and other reference signals including a set of channel state information reference signals that are received prior to the transmission of the set of sounding reference signals.

In some embodiments, a corresponding value of the rank indicator in a channel state information feedback report corresponding to a Type-II port selection codebook family is limited to a constrained rank indicator value that is less than or equal to: a value 4; a corresponding value of a number of configured sounding reference signal ports; a function of a number of supported sounding reference signal port transmissions indicated by a user equipment capability parameter corresponding to transmit antenna port switching for the set of sounding reference signals; or some combination thereof.

In various embodiments, a number of bits allocated for reporting the rank indicator in a first part of the channel state information feedback report is based on a base-two logarithmic function of the constrained rank indicator value.

In one embodiment, a higher layer parameter in downlink control information indicates that channel state information feedback is based on frequency division duplexing channel reciprocity.

In certain embodiments, a channel state information feedback parameter $M_{\nu}$ is set to one for a subset of a set of layers.

In some embodiments, the set of ports are partitioned into two sets of ports comprising a first set of ports and a second set of ports, and each port of the set of ports maps to a corresponding layer.

In various embodiments, a channel state information feedback report size, a channel state information feedback report format, channel state information feedback report parameter values, or some combination thereof vary across layers corresponding to the first set of ports, and layers corresponding to the second set of ports.

In one embodiment, a method comprises: receiving a set of sounding reference signals; transmitting a set of channel state information reference signals, wherein the set of channel state information reference signals are determined based on the set of sounding reference signals received by a network, and a set of ports is identified based on the set of channel state information reference signals; and receiving channel state information feedback comprising a rank indicator indicating a number of layers.

In certain embodiments, the set of sounding reference signals and the set of channel state information reference signals are configured with downlink control information.

In some embodiments, the set of sounding reference signals are configured with aperiodic transmission.

In various embodiments, the set of channel state information reference signals are configured with aperiodic reception.

In one embodiment, a transmit spatial filter used to transmit the set of sounding reference signals is the same as a receive spatial filter used to receive the set of channel state information reference signals.

In certain embodiments, the transmit spatial filter and the receive spatial filter are used within a given number of slots after receiving downlink control information that triggers the set of sounding reference signals, the set of channel state information reference signals, or a combination thereof.

In some embodiments, the receive spatial filter and the transmit spatial filter are used within a given number of slots after transmitting the set of sounding reference signals.

In various embodiments, the transmit spatial filter for the set of sounding reference signals is the same as the receive spatial filter for a subsequent set of channel state information reference signals in response to at least one of the following: a higher-layer parameter related to a codebook type is set to a class of type-II port selection codebooks, a higher-layer parameter related to a report quantity includes precoding matrix information, and a higher-layer parameter related to usage of the set of sounding reference signals is set to antenna switching.

In one embodiment, the transmit spatial filter for the set of sounding reference signals is the same as the receive spatial filter for a subsequent set of channel state information reference signals in response to a quasi-co-location relationship of at least Type D between the set of channel state information reference signals and other reference signals including the set of sounding reference signals.

In certain embodiments, the transmit spatial filter for the set of sounding reference signals is the same as the receive spatial filter for a subsequent set of channel state information reference signals in response to a quasi-co-location relationship of at least Type D between the set of channel state information reference signals and other reference signals including a set of channel state information reference signals that are received prior to the transmission of the set of sounding reference signals.

In some embodiments, a corresponding value of the rank indicator in a channel state information feedback report corresponding to a Type-II port selection codebook family is limited to a constrained rank indicator value that is less than or equal to: a value 4; a corresponding value of a number of configured sounding reference signal ports; a function of a number of supported sounding reference signal port transmissions indicated by a user equipment capability parameter corresponding to transmit antenna port switching for the set of sounding reference signals; or some combination thereof.

In various embodiments, a number of bits allocated for reporting the rank indicator in a first part of the channel state information feedback report is based on a base-two logarithmic function of the constrained rank indicator value.

In one embodiment, a higher layer parameter in downlink control information indicates that channel state information feedback is based on frequency division duplexing channel reciprocity.

In certain embodiments, a channel state information feedback parameter My is set to one for a subset of a set of layers.

In some embodiments, the set of ports are partitioned into two sets of ports comprising a first set of ports and a second set of ports, and each port of the set of ports maps to a corresponding layer.

In various embodiments, a channel state information feedback report size, a channel state information feedback report format, channel state information feedback report parameter values, or some combination thereof vary across layers corresponding to the first set of ports, and layers corresponding to the second set of ports.

In one embodiment, an apparatus comprises: a receiver that receives a set of sounding reference signals; and a transmitter that transmits a set of channel state information reference signals, wherein the set of channel state information reference signals are determined based on the set of sounding reference signals received by a network, and a set of ports is identified based on the set of channel state information reference signals; wherein the receiver receives channel state information feedback comprising a rank indicator indicating a number of layers.

In certain embodiments, the set of sounding reference signals and the set of channel state information reference signals are configured with downlink control information.

In some embodiments, the set of sounding reference signals are configured with aperiodic transmission.

In various embodiments, the set of channel state information reference signals are configured with aperiodic reception.

In one embodiment, a transmit spatial filter used to transmit the set of sounding reference signals is the same as a receive spatial filter used to receive the set of channel state information reference signals.

In certain embodiments, the transmit spatial filter and the receive spatial filter are used within a given number of slots after receiving downlink control information that triggers the set of sounding reference signals, the set of channel state information reference signals, or a combination thereof.

In some embodiments, the receive spatial filter and the transmit spatial filter are used within a given number of slots after transmitting the set of sounding reference signals.

In various embodiments, the transmit spatial filter for the set of sounding reference signals is the same as the receive spatial filter for a subsequent set of channel state information reference signals in response to at least one of the following: a higher-layer parameter related to a codebook type is set to a class of type-II port selection codebooks, a higher-layer parameter related to a report quantity includes precoding matrix information, and a higher-layer parameter related to usage of the set of sounding reference signals is set to antenna switching.

In one embodiment, the transmit spatial filter for the set of sounding reference signals is the same as the receive spatial filter for a subsequent set of channel state information reference signals in response to a quasi-co-location relationship of at least Type D between the set of channel state information reference signals and other reference signals including the set of sounding reference signals.

In certain embodiments, the transmit spatial filter for the set of sounding reference signals is the same as the receive spatial filter for a subsequent set of channel state information reference signals in response to a quasi-co-location relationship of at least Type D between the set of channel state information reference signals and other reference signals including a set of channel state information reference signals that are received prior to the transmission of the set of sounding reference signals.

In some embodiments, a corresponding value of the rank indicator in a channel state information feedback report corresponding to a Type-II port selection codebook family is limited to a constrained rank indicator value that is less than or equal to: a value 4; a corresponding value of a number of configured sounding reference signal ports; a function of a number of supported sounding reference signal port transmissions indicated by a user equipment capability parameter corresponding to transmit antenna port switching for the set of sounding reference signals; or some combination thereof.

In various embodiments, a number of bits allocated for reporting the rank indicator in a first part of the channel state information feedback report is based on a base-two logarithmic function of the constrained rank indicator value.

In one embodiment, a higher layer parameter in downlink control information indicates that channel state information feedback is based on frequency division duplexing channel reciprocity.

In certain embodiments, a channel state information feedback parameter My is set to one for a subset of a set of layers.

In some embodiments, the set of ports are partitioned into two sets of ports comprising a first set of ports and a second set of ports, and each port of the set of ports maps to a corresponding layer.

In various embodiments, a channel state information feedback report size, a channel state information feedback report format, channel state information feedback report parameter values, or some combination thereof vary across layers corresponding to the first set of ports, and layers corresponding to the second set of ports.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving configuration information in downlink control information (DCI), wherein the configuration information comprises a reciprocity flag that indicates that channel state information (CSI) feedback is based on channel reciprocity;

transmitting a set of sounding reference signals (SRSs) using a transmit spatial filter;

receiving a set of channel state information reference signals (CSI-RSs) using a receive spatial filter, wherein the set of CSI-RSs are determined based on the set of SRSs;

identifying a set of ports based on the set of CSI-RSs;

generating one or more amplitude and phase coefficient indicators for each port of the set of ports based on the set of CSI-RSs and the configuration information; and transmitting CSI feedback comprising a rank indicator indicating a number of layers and the one or more amplitude and phase coefficient indicators, wherein the transmit spatial filter and the receive spatial filter are used within a given number of slots after receiving the DCI that triggers the set of SRSs, or the set of CSI-RSs, or both.

2. The method of claim 1, wherein the set of SRSs and the set of CSI-RSs are configured with the DCI.

3. The method of claim 1, wherein the SRSs are configured with aperiodic transmission.

4. The method of claim 1, wherein the set of CSI-RSs are configured with aperiodic reception.

5. The method of claim 1, wherein the transmit spatial filter used to transmit the set of SRSs is the same as the receive spatial filter used to receive the set of CSI-RSs.

6. The method of claim 5, wherein the receive spatial filter and the transmit spatial filter are used within a given number of slots after transmitting the set of SRSs.

7. The method of claim 5, wherein the transmit spatial filter for the set of SRSs is the same as the receive spatial filter for a subsequent set of CSI-RSs in response to at least one of the following: a higher-layer parameter related to a codebook type is set to a class of type-II port selection codebooks, a higher-layer parameter related to a report quantity includes precoding matrix information, and a higher-layer parameter related to usage of the set of SRSs is set to antenna switching.

8. The method of claim 5, wherein the transmit spatial filter for the set of SRSs is the same as the receive spatial filter for a subsequent set of CSI-RSs in response to a quasi-co-location (QCL) relationship of at least Type D between the set of CSI-RSs and other reference signals including the set of SRSs.

9. The method of claim 5, wherein the transmit spatial filter for the set of SRSs is the same as the receive spatial filter for a subsequent set of CSI-RSs in response to a quasi-co-location (QCL) relationship of at least Type D between the set of CSI-RSs and other reference signals including a set of CSI-RSs that are received prior to the transmission of the set of SRSs.

10. The method of claim 1, wherein a corresponding value of the rank indicator in a CSI feedback report corresponding to a Type-II port selection codebook family is limited to a constrained rank indicator value that is less than or equal to one or more of:

a value of 4;

a corresponding value of a number of configured SRS ports; or a function of a number of supported SRS port transmissions indicated by a UE capability parameter corresponding to transmit antenna port switching for the set of SRSs.

11. The method of claim 10, wherein a number of bits allocated for reporting the rank indicator in a first part of the CSI feedback report is based on a base-two logarithmic function of the constrained rank indicator value.

12. The method of claim 1, wherein a higher layer parameter in the DCI indicates that CSI feedback is based on frequency division duplexing channel reciprocity.

13. The method of claim 12, wherein a CSI feedback parameter Mv is set to one for a subset of a set of layers.

14. The method of claim 1, wherein the set of ports are partitioned into two sets of ports comprising a first set of ports and a second set of ports, and each port of the set of ports maps to a corresponding layer.

15. The method of claim 14, wherein one or more of a CSI feedback report size, a CSI feedback report format, or CSI feedback report parameter values vary across layers corresponding to the first set of ports, and layers corresponding to the second set of ports.

16. A user equipment (UE), comprising:

at least one memory; and at least one processor coupled with the at least one memory and configured to cause the UE to:

receive configuration information in downlink control information (DCI), wherein the configuration information comprises a reciprocity flag that indicates that channel state information (CSI) feedback is based on channel reciprocity;

transmit a set of sounding reference signals (SRSs) using a transmit spatial filter;

receive a set of channel state information reference signals (CSI-RSs) using a receive spatial filter, wherein the set of CSI-RSs are determined based on the set of SRSs;

identify a set of ports based on the set of CSI-RSs;

generate one or more amplitude and phase coefficient indicators for each port of the set of ports based on the set of CSI-RSs and the configuration information; and transmit CSI feedback comprising a rank indicator indicating a number of layers and the one or more amplitude and phase coefficient indicators and wherein the transmit spatial filter and the receive spatial filter are used within a given number of slots after receiving the DCI that triggers the set of SRSs, or the set of CSI-RSs, or both.

17. The UE of claim 16, wherein the transmit spatial filter used to transmit the set of SRSs is the same as the receive spatial filter used to receive the set of CSI-RSs.

18. The UE of claim 16, wherein a corresponding value of the rank indicator in a CSI feedback report corresponding to a Type-II port selection codebook family is limited to a constrained rank indicator value that is less than or equal to one or more of:

a value of 4;

a corresponding value of a number of configured SRS ports; or a function of a number of supported SRS port transmissions indicated by a UE capability parameter corresponding to transmit antenna port switching for the set of SRSs.

19. The UE of claim 16, wherein the SRSs are configured with aperiodic transmission.

20. The UE of claim 16, wherein the set of CSI-RSs are configured with aperiodic reception.

* * * * *